No. 765,291. Patented July 19, 1904.

UNITED STATES PATENT OFFICE.

WINCENTY MATZKA, OF VECHELDE, GERMANY.

PROCESS OF PREPARING COMPOSITIONS FOR SULFUR-BATHS.

SPECIFICATION forming part of Letters Patent No. 765,291, dated July 19, 1904.

Application filed October 8, 1903. Serial No. 176,286. (No specimens.)

*To all whom it may concern:*

Be it known that I, WINCENTY MATZKA, a subject of the Emperor of Austria-Hungary, residing at Vechelde, near Braunschweig, in the Kingdom of Prussia, Germany, have invented a certain new and useful Improvement in Processes of Preparing a Composition for Sulfur-Baths, of which the following is a specification.

As it is known, considerable difficulty attends the preparation of sulfur-baths by the suspension in water of natural sulfurous mud or by dissolving therein hepar, (liver of sulfur,) and such difficulty prevents the preparation of such baths in private houses, although their use would be desirable. These difficulties are, on the one hand, that the decomposition of the sulfurous materials is accompanied by the evolution of sulfureted hydrogen, accompanied by the disagreeable odor characteristic of the latter, and, on the other hand, that the presence of insoluble constituents (particularly if sulfurous mud is used) makes the bath turbid, dirty-looking, and disgusting. Another important consideration is that neither the sulfur-mud nor the hepar will stand transport readily, and even if transported the carriage, owing to the large proportion of foreign matter, is excessive, particularly with the sulfur-mud. All these circumstances render the preparation of such baths in private houses difficult, expensive, and unpleasant to such a degree as to make the same impracticable.

It will be clear from the foregoing that it will mark a material technical advance to find a preparation free from the above-named objections, not easily decomposable, readily transportable, and which in small bulk will contain just so much sulfur as is requisite for one bath. The present invention is this particular step in technical progress.

In the process here in question advantage is taken of the well-known property of hepar, or liver of sulfur, to dissolve in strong spirits of wine. Numerous experiments have demonstrated that such solution will keep well and will not readily decompose. In accordance with this invention there are added to such solution essential oils, particularly such as are obtained from the needles of coniferæ. The surprising fact has been ascertained that the permanency of alcoholic solutions of liver of sulfur is materially enhanced by the addition of such essential oils. Such addition, in fact, prevents decomposition of the liver of sulfur, even when the same is brought into contact with water, so that baths made with such preparation do not contain the least trace of sulfureted hydrogen. This process, therefore, is based upon the solution of liver of sulfur in alcohol, followed by the mixing with such solution of essential oil obtained from the needles of coniferæ, turpentine being added, if desired.

One mode of carrying the said invention into effect consists in dissolving the liver of sulfur in pure or nearly pure alcohol, filtering the solution, if required, and then adding thereto suitable quantities of the above-named essential oils and, if desired, turpentine.

It is evident that by suitably choosing the proportions sulfur-baths may be obtained, or preparations for producing sulfur-baths, the amount of sulfur in which will be equivalent to that of the natural baths.

The following proportions have been found very suitable: Take of alcohol ninety-five per cent. pure one thousand cubic centimeters, with which are mixed about one hundred and eighty cubic centimeters of turpentine and seventy cubic centimeters of essential oil obtained by distillation of the needles. In this dissolve four hundred grains of liver of sulfur. Two hundred cubic centimeters of the solution so obtained will make one bath. The bath is made by adding the solution to the bath-water.

The use of such permanent, cheap, easily-transported preparation, free from all disagreeable smell, will, as has already been explained, obviate all the disadvantages inherent to the sulfur-baths hitherto employed, and baths made with such preparation are all the more advantageous, as, besides the sulfurous constituents, there are available the valuable therapeutic effects of the essential oils, the latter having a twofold effect, as, on the one hand, they prevent decomposition of the liver of sulfur and, on the other, they are in themselves directly beneficial. Where such easily-transported permanent preparations are used, the administration of sulfur-baths in a private house presents no difficulty, and the cost is very considerably lower than heretofore.

What I claim, and desire to secure by Letters Patent of the United States, is—

1. The method of obtaining a preparation suitable for making sulfur-baths which consists in dissolving liver of sulfur in alcohol and adding essential oils which act as binders against the decomposition of the alcoholic solution, substantially as described.

2. The method of obtaining a preparation suitable for making sulfur-baths, which consists in dissolving liver of sulfur in alcohol and adding oils extracted from the needles of coniferæ, substantially as described.

3. The method of obtaining a preparation suitable for making sulfur-baths, which consists in dissolving liver of sulfur in alcohol and adding oils obtained by distilling the needles of coniferæ with steam, substantially as described.

4. The method of obtaining a preparation suitable for making sulfur-baths, which consists in dissolving liver of sulfur in alcohol and adding essential oils which act as binders against the decomposition of the alcoholic solution, and turpentine, substantially as described.

5. The method of obtaining a preparation suitable for making sulfur-baths, which consists in dissolving liver of sulfur in alcohol and adding oils extracted from the needles of coniferæ, and turpentine, substantially as described.

6. The method of obtaining a preparation suitable for making sulfur-baths, which consists in dissolving liver of sulfur in alcohol and adding oils obtained by distilling the needles of coniferæ with steam, and turpentine, substantially as described.

In testimony whereof I have hereunto set my hand in presence of two subscribing witnesses.

WINCENTY MATZKA.

Witnesses:
EMIL PAPENBRUCH,
PAUL NOACK.